US009257000B2

(12) United States Patent
Tavano

(10) Patent No.: US 9,257,000 B2
(45) **Date of Patent: *Feb. 9, 2016**

(54) METHOD AND SYSTEM FOR VARYING THE TAKE-OUT OR RAKE RATE ON WAGERS PLACED IN A WAGERING POOL

(71) Applicant: Louis J. Tavano, Las Vegas, NV (US)

(72) Inventor: Louis J. Tavano, Las Vegas, NV (US)

(73) Assignee: Lou Tavano, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/221,686

(22) Filed: Mar. 21, 2014

(65) Prior Publication Data

US 2014/0206439 A1 Jul. 24, 2014

Related U.S. Application Data

(63) Continuation of application No. PCT/US2012/055921, filed on Sep. 18, 2012, and a continuation-in-part of application No. 13/245,094, filed on Sep. 26, 2011, now Pat. No. 8,430,748.

(51) Int. Cl.
*G06F 17/00* (2006.01)
*G07F 17/32* (2006.01)

(52) U.S. Cl.
CPC ............ *G07F 17/32* (2013.01); *G07F 17/3288* (2013.01)

(58) Field of Classification Search
USPC .................................................. 463/6, 26–30
See application file for complete search history.

(56) References Cited

U.S. PATENT DOCUMENTS

| | | | |
|---|---|---|---|
| 4,842,278 | A | 6/1989 | Markowicz |
| 5,275,400 | A | 1/1994 | Weingardt et al. |
| 5,476,259 | A | 12/1995 | Weingardt |
| 5,779,547 | A | 7/1998 | SoRelle et al. |
| 5,984,779 | A | 11/1999 | Bridgeman et al. |
| 6,331,148 | B1 | 12/2001 | Krause et al. |
| 6,634,946 | B1 | 10/2003 | Bridgeman et al. |
| 6,695,701 | B2 | 2/2004 | Aronson et al. |
| 6,910,965 | B2 | 6/2005 | Downes |
| 6,935,948 | B2 | 8/2005 | Wright |
| 7,094,151 | B2 | 8/2006 | Downes |
| 7,204,756 | B2 | 4/2007 | Jubinville et al. |
| 7,302,412 | B1 | 11/2007 | Speck |

(Continued)

FOREIGN PATENT DOCUMENTS

| | | |
|---|---|---|
| KR | 10-2002-0007100 | 1/2002 |
| KR | 10-2005-0023496 | 3/2005 |

OTHER PUBLICATIONS

Twinspires, http://www.twinspires.com/content/0Pick5arlington/calder, Jul. 5, 2011.
Ray Paulick, "Rebate Debate," http://www.bloodhorse.com, Jul. 30, 2002.

(Continued)

*Primary Examiner* — Ronald Laneau
(74) *Attorney, Agent, or Firm* — Weide & Miller, Ltd.

(57) ABSTRACT

In a method of wagering, one or more primary bettors place wagers having an applicable base take-out or rake rate, and thus yielding a base payout for winning wagers. One or more secondary bettors may place wagers having an applicable modified take-out or rake rate (preferably lower than the base take-out or rake rate), thus yielding a higher payout for winning wagers than the base payout. The wagering may occur relative to card games such as poker, or other types of games or events, including sports betting. Bets may be placed with a host, such as a casino or track, or an off-track entity.

19 Claims, 4 Drawing Sheets

(56) References Cited

U.S. PATENT DOCUMENTS

| | | | | |
|---|---|---|---|---|
| 7,361,085 | B2 | 4/2008 | Packes, Jr. et al. | |
| 7,442,124 | B2 | 10/2008 | Asher et al. | |
| 7,537,521 | B2 | 5/2009 | Amour | |
| 7,582,013 | B2 | 9/2009 | Asher et al. | |
| 7,635,302 | B2 | 12/2009 | Wright | |
| 7,707,215 | B1 | 4/2010 | Huberman et al. | |
| 7,749,078 | B2 | 7/2010 | Vlazny et al. | |
| 7,755,786 | B2 | 7/2010 | Foehr et al. | |
| 7,788,158 | B2 | 8/2010 | Pennock | |
| 8,007,354 | B2 | 8/2011 | Mindes | |
| 8,241,114 | B2 | 8/2012 | Fontaine et al. | |
| 8,430,748 | B2 | 4/2013 | Tavano | |
| 2004/0111358 | A1* | 6/2004 | Lange et al. | 705/37 |
| 2004/0235542 | A1 | 11/2004 | Stronach et al. | |
| 2005/0003888 | A1 | 1/2005 | Asher et al. | |
| 2005/0176499 | A1* | 8/2005 | Stronach | 463/27 |
| 2006/0009281 | A1 | 1/2006 | Stronach | |
| 2006/0205483 | A1* | 9/2006 | Meyer et al. | 463/25 |
| 2009/0215527 | A1 | 8/2009 | Lipscomb et al. | |
| 2009/0298580 | A1 | 12/2009 | Asher et al. | |
| 2010/0144428 | A1 | 6/2010 | Fontaine et al. | |
| 2011/0081955 | A1 | 4/2011 | Lange et al. | |
| 2013/0237311 | A1 | 9/2013 | Tavano | |

OTHER PUBLICATIONS

Tom Lamarra, “Pricing Pits Industry Against Some High-Volume Bettors,” http://www.bloodhorse.com, Mar. 5, 2004.

Joe Drape, “Horse Racing; Horse Racing’s Biggest Bettors Are Reaping Richest Rewards,” http://www.nytimes.com, Apr. 26, 2004.

Government Law Center of Albany Law School, Government Law Online, “What Do We Do About Rebates?”, www.governmentlaw.org, Nov. 2003.

Racing & Wagering “Rules You Should Know,” http://www.arlingtonpark.com/racing-handicapping/wagering-information/rules-you-should, Aug. 1, 2011.

New York Net Pool Pricing by NYRA Press Office, http://www.nyra.com/belmont/nws.asp?track=B&id=1758, Oct. 22, 2005.

Net Pool Pricing, http://theredmile.com/index.cfm?a=188, Jul. 12, 2011.

TwinSpires Blog: Net Pool Pricing Revised by Derek Simon, http://blog.twinspires.com/2011/03/net-pool-pricing-revised.html, Mar. 30, 2011.

Net Pool Pricing, http://www.woodbineentertainment.com/woodbine/betting/uscommonpoolw, Jul. 12, 2011.

PCT “Notification of Transmittal of the International Search Report and the Written Opinion of the International Searching Authority or the Declaration,” for PCT/US2012/055921, mailed Mar. 14, 2013, 10 pages.

* cited by examiner

| TRACK | HORSE | WAGER | TAKE-OUT POINTS |
|---|---|---|---|
| BETTOR A | 1 | $ 20,000 | N/A |
| BETTOR B | 2 | $ 10,000 | N/A |
| OTB | | | |
| BETTOR C | 1 | $ 10,000 | 5 |
| BETTOR D | 2 | $ 30,000 | 3 |
| BETTOR E | 1 | $ 20,000 | 0 |
| | | $ 90,000 | TOTAL WAGERS (GPMP) |
| 10% TAKE-OUT : | | - $ 9,000 | |
| | | $ 81,000 | TOTAL RETURN POOL (NPMP) |

HORSE 1 WINS :
BASE PAYOUTS
- BETTOR A SHARE : $ 20,000 / $ 50,000 . $ 81,000 = $ 32,400
- BETTOR C SHARE : $ 10,000 / $ 50,000 . $ 81,000 = $ 16,200
- BETTOR E SHARE : $ 20,000 / $ 50,000 . $ 81,000 = $ 32,400

$ 81,000

MODIFY BETTOR C PAYOUT BECAUSE OF TAKE-OUT POINTS:
10% TAKE-OUT - 5 POINTS = 5% TAKE-OUT
$ 90,000 WAGERS X 5% = $ 4,500 TAKE-OUT = $ 85,500 TOTAL POOL
BETTOR C SHARE : $ 10,000/ $ 50,000 . $ 85,500 = $ 17,100
- 16,200 FROM POOL
+ $ 900 FROM OTB

TRACK TAKE :
TRACK WAGERS $30,000 X 10% = $3,000
+ OTB COMMISSION $60,000 X 3% = $1,800
$ 4,800

OTB TAKE:
OTB WAGERS : $60,000 X 10% = $6,000
- TRACK COMMISSION (3%) - 1,800
- BETTOR C RETURN - 900
$ 3,300

FIG. 2

RACE 4:

| | | |
|---|---|---|
| TOTAL WAGERS: | $209,886 | (GPMP) |
| LESS 20% TAKE-OUT: | $41,977 | |
| TOTAL POOL: | $167,909 | (NPMP) |

$1 EXACTA TICKET PAYS $60.81
(2761 WINNING TICKETS)

OTB TAKE-OUT POINT RETURNS:

| | MODIFIED POOL | NEW TICKET PAY |
|---|---|---|
| 5 TAKE-OUT POINTS / 15% TAKE-OUT: | $178,404 | $64.61 |
| 10 TAKE-OUT POINTS / 10% TAKE-OUT: | $188,898 | $68.41 |
| 15 TAKE-OUT POINTS / 5% TAKE-OUT: | $199,392 | $72.21 |
| 20 TAKE-OUT POINTS / 0% TAKE-OUT: | $209,886 | $76.02 |

FIG. 3

SUPER LOTTERY

| STATE | TOTAL TICKETS | RETURN |
|---|---|---|
| PA | $30M | $9M |
| IA | $18M | $5.4M |
| MT | $19M | $5.7M |
| FL | $28M | $8.4M |
| TX | $43M | $12.9M |
| OK | $20M | $6M |
| WA | $39M | $11.7M |
| AZ | $28M | $8.4M |
| NY | $40M | $12M |
| IL | $35M | $10.5M |
| | $300M | $90M |

TAKE-OUT = 32% ( x $300M) = $96M
ADMIN FEE = 2% ( x $300M) = $ 6M
RETURN TO STATES = 30% = $90M
JACKPOT WINER ( $300M - $96M) = $204M

IF LOTTERY TICKET A IN IOWA SELECTED A 25% TAKE-OUT RATE :
TICKET A = + 5% ($300M) = $15M (WHOLE POOL)
= + 5% ( $18M) = $0.9M (IOWA POOL)

FIG. 4

METHOD AND SYSTEM FOR VARYING THE TAKE-OUT OR RAKE RATE ON WAGERS PLACED IN A WAGERING POOL

RELATED APPLICATION DATA

This application is a continuation of PCT/US2012/055921, filed Sep. 18, 2012, and claims priority to U.S. patent application Ser. No. 13/245,094, filed Sep. 26, 2011, now U.S. Pat. No. 8,430,748.

FIELD OF THE INVENTION

The present invention relates to pari-mutuel wagering.

BACKGROUND OF THE INVENTION

Pari-mutuel wagering is a well established method of wagering. In accordance with pari-mutuel wagering, bettors' wagers are aggregated into a pool, less a house commission. This commission, which may be referred to as the "take-out" or "vig", may comprise a percentage of each wager. For example, relative to horse racing wagers, the house or track take-out may be 10-30%, depending upon the particular wager and race track. The results of the wagered-upon event are determined and the number of bettors who won their wagers is determined. The winning bettors each share the winnings pool in proportion to the size of their wager to the other winning wagers.

For example, ten bettors may each wager $100, five of the bettors wagering that Horse 1 will win a certain race and five of the bettors wagering that Horse 2 will win the race. Assuming that the house take-out is 15%, $15 of each bettor's $100 wager is taken by the house (for a total house take-out of $150) and the remaining $85 of each bettor's $100 wager is placed into the winnings pool (for a total winnings pool of $850). Assuming that Horse 1 wins the race, the five bettors who correctly wagered upon Horse 1 each share in the $850 winnings pool and are each thus paid $850/5, or $170.

This arrangement has been utilized for many years at racetracks and similar locations. Originally, bettors had to travel to the racetrack in order to place their wagers. This meant that many bettors who wanted to place bets couldn't, and also meant that tracks often missed the opportunity to accept wagers from certain bettors.

In order to solve this problem, off-track betting (OTB) locations were created. OTB operators take bets from bettors and place them with the track host. For example, an OTB operator in Nevada may accept wagers from bettors in Las Vegas and place them with the host of a horse track in New York. In this arrangement, track hosts are able to garner a higher volume of wagers. In order to facilitate these OTB operators, track hosts typically permit the OTB operator to place their bettors' wagers subject to a commission payable to the track host. For example, a track host may require that an OTB pay a commission on the gross wagers placed with the OTB. The OTB charges the same take-out of 10-30% to their bettors and then pays the track host commission from that take-out. This allows the OTB operator who charges a 15% take-out to their bettors, and who pays a 3% commission to the track host, to retain 12% of the wagers placed at an OTB—an incentive which drives a higher level of betting to the track, on which addition betting the track host still collects 3%.

However, OTB's have a desire to provide their bettors with further incentive to place bets.

SUMMARY OF THE INVENTION

Aspects of the invention comprise methods of wagering and wagering systems.

In a method of pari-mutuel wagering, one or more first or base bettors place wagers having an applicable base or original take-out rate, and thus yielding a base pari-mutuel payout for winning wagers. One or more second or modified bettors may place wagers into the same pool, those wagers having an applicable lower second or modified take-out rate, thus yielding a higher payout for winning wagers than the base payout.

In embodiment of the invention, a first entity or host offers a pari-mutuel wagering event in which the host and/or one or more non-host distributors accept wagers upon the pari-mutuel event, wherein the pari-mutuel event has a base take-out rate applicable thereto and wherein primary or base bettors who place winning wagers at the base take-out rate are paid winnings from a pari-mutuel pool created from wagers placed upon the pari-mutuel wagering event based upon the base take-out rate. In addition, in accordance with the invention, one or more secondary bettors are permitted to place wagers with one of the non-host distributors at a modified take-out rate. Preferably, a secondary bettor is permitted to select or customize the modified take-out rate which is applicable to their wager. As to each secondary bettor who places a winning wager, the non-host distributor pays winnings to the secondary bettor based upon the modified take-out rate applied to the pari-mutuel pool.

In one embodiment, all wagers on the pari-mutuel wagering event may be pooled into a total or gross pari-mutuel wager pool. The base take-out rate may be applied to the total wager pool and be deducted there from, thus generating a return or net pari-mutuel pool. Winning bettors who placed wagers at the base take-out rate may be paid a basic payout comprising a proportion of the return pool, which proportion based upon the size of their wager to all winning wagers.

Winning bettors who placed wagers at a modified (and preferably, reduced) take-out rate may be paid a higher payout comprising a proportion of a modified or recalculated return pool, which proportion is based upon the size of their wager to all winning wagers. The modified or recalculated return pool comprises the total wager pool less a modified take-out amount, which modified take-out amount comprises the modified take-out rate applied to the total wager pool. The winnings paid to bettors who placed wagers at the modified take-out rate do not affect the winnings payable to the bettors who placed winning wagers at the base take-out rate.

The principles of the invention may be applied to various wagering opportunities, such as wagering upon events such as horse races, dog races, sports events, lotteries, poker, keno, bingo and other games. In the case of other types of events, such as card games, the take-out may be referred to as a rake or vigorish.

In one embodiment, wagers may be placed via one or more wagering systems. A wagering system may include one or more wagering kiosks, such as at a track. The system may also include one or more servers for receiving wager information from one or more remote devices such as bettor's computers or portable electronic devices, and for displaying wagering event information to the bettor via those devices.

Further objects, features, and advantages of the present invention over the prior art will become apparent from the detailed description of the drawings which follow, when considered with the attached figures.

DESCRIPTION OF THE DRAWINGS

FIG. 2 illustrates one example of horse race wagering conducted in accordance with the present invention;

FIG. 3 illustrates another example of horse race wagering conducted in accordance with the present invention; and FIG. 4 illustrates one example of a lottery conducted in accordance with the present invention.

DETAILED DESCRIPTION OF THE INVENTION

Figure 1:
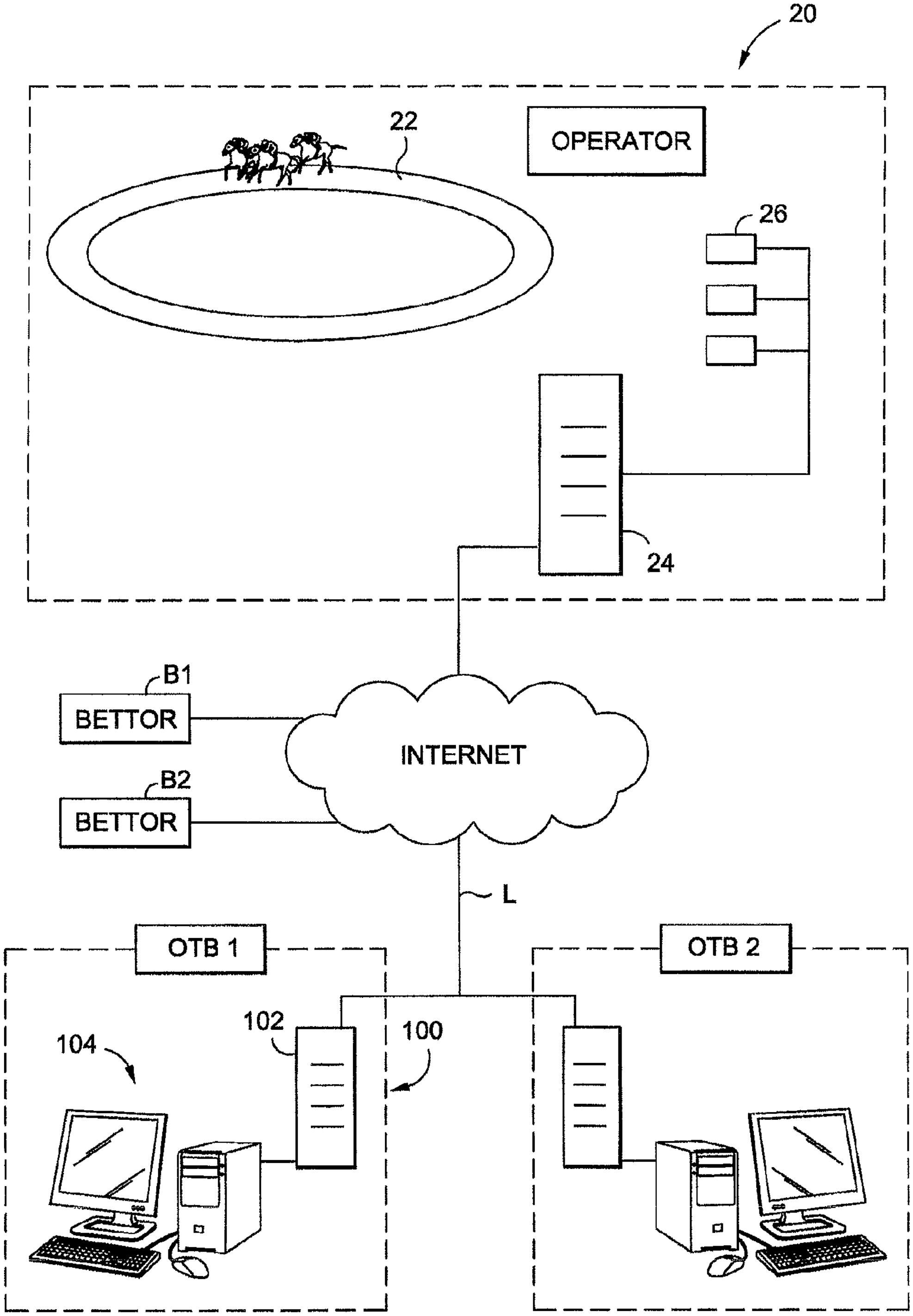
FIG. 1 is a diagram illustrating one embodiment of a system of the invention, the system comprising one environment of a method of the invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a system and method for customizing the take-out, and thus the return or payout to a winning bettor, in a pari-mutuel or similar wagering environment. In a general, in accordance with the invention, one or more winning bettors may be paid winnings based upon a modified take-out rate which is lower than a normal or base, first take-out rate.

In one embodiment, a first entity offers or presents a wagering opportunity. This first entity may be referred to as a host (or the house or a stakeholder). The host might comprise, for example, a horse race track host. However, the host need not comprise the entity which hosts or presents the underlying event that the wagering event is offered upon.

As indicated, the wagering opportunity is preferably offered in relation to an event. As detailed below, such an event may comprise a wide range of events or activities. In one embodiment, for example, the wagering opportunity may be presented relative to one or more horse races. Preferably, the outcome of the underlying event determines the one or more winners of the wagering opportunity.

In a preferred embodiment, the host offers a wagering opportunity which includes a pari-mutuel pool. In one embodiment, the host and/or one or more second entities, which second entities may be referred to as non-host distributors of the wagering opportunity, accept wagers from wagering customers or bettors. As described below, a non-host distributor may comprise an off track betting location or OTB.

In a preferred embodiment, the sum of the wagers collected from bettors who wager upon the wagering opportunity defines a gross pari-mutuel pool (GPMP). In one embodiment, the host and non-host distributors charge a take-out rate to the wagering opportunity. The take-out rate comprises a deduction or charge against the GPMP. The GPMP less this take-out or charge defines a net pari-mutuel pool (NPMP) or the "return" pool. As defined below, this NPMP comprises a sum which is distributed to the one or more winners of the wagering opportunity.

In a preferred embodiment of the invention, as detailed below, the host charges a first take-out rate (which may be referred to as a "base" or "original" take-out rate), while the one or more non-host distributors accept one or more wagers for participation in the pari-mutuel pool at one or more modified take-out rates (which may be referred to as a "modified" take-out rate), which modified take-out rates are preferably lower than the first take-out rate. In a preferred embodiment, the non-host distributors permit bettors themselves to select a desired modified take-out rate. Winning bettors who place wagers at the modified take-out rate are paid greater winnings than those bettors who place wagers at the higher base take-out rate.

In one embodiment, the non-host distributor retains the take-out which is applicable to each wager which is accepted by the non-host distributor. The non-host distributor pays a commission or charge to the host, such as the track, at a rate which is lower than the base take-out rate. The non-host distributor may pay that commission and winning bettors from the take-out which the non-host distributor charges its bettors and retains any remaining amounts as earnings.

As described below, the invention has applicability to a number of different wagering events and environments such as lotteries, poker games, bingo games, keno games, sports wagering or events, jai alia, horse and dog race wagering and the like, wherein pari-mutuel or similar wagering pools are utilized.

One embodiment of a system of the invention, which system may comprise an environment for employing or implementing methods of the invention, will be described with reference to FIGS. 1 and 2. In the example illustrated in FIG. 1, a host 20 such as a horse track operator operates a horse racing track 22 at which a number of horse races may be run. The host 20 also operates a wagering system by which wagering opportunities are presented. The system may include at least one controller or server 24, and one or more betting stations 26.

The controller or server 24, which is often referred to as a "totalizator system" in the industry, may comprise, for example, one or more computing devices. The server 24 preferably comprises at least one controller or processor, one or more data storage devices such as hard drives, flash drives, RAM, ROM, EPROM, or other types of data storage devices now known or later developed, and one or more communication interfaces. The server 24 is preferably configured to execute various instructions either embodied as hardware or embodied as computer readable code or "software" which is executed by a controller. The software may be stored on the associated memory or data storage devices, for example.

In one embodiment, each betting station 26 is configured to accept wagers from bettors. The betting stations 26 may have a variety of configurations. For example, the betting stations 26 may comprise kiosk type devices having limited computing or processing capabilities. The betting stations 26 may include at least one display such as an LCD, LED, plasma, CRT or other type of video display now known or later developed, configured to display wagering information to a bettor. The betting stations 26 preferably include one or more input devices such as keypads, keyboards, touch screens, buttons, joysticks or the like, configured to accept input from a bettor.

In a preferred embodiment, each betting station 26 includes one or more wager accepting devices. Such devices are well known and may comprise, for example, bill or coin acceptors, a credit card reader or other device configured to read or accept items of value and provide credit there for. In addition, in a preferred embodiment, each betting station 26 includes a ticket or media printer. The media printer is preferably configured to print or dispense a receipt to a bettor, which receipt evidences the bettor's wager.

The betting stations 26 include at least one communication interface which permits them to communicate with the server 24. For example, as described, the betting stations 26 may receive horse race information from the server 24 and transmit back accepted wager information to the server 24. The betting stations 26 and server 24 may communicate by one or more wired or wireless communication links. Preferably the links and/or the manner of communication is secure, such as by having the links be dedicated and/or by encoding or encrypting the exchanged information in order to prevent its interception and/or tampering.

The components of each betting station 26 may be located in or supported by a housing or the like. Such a housing may allow the betting stations 26 to be free-standing, or they may be located on or in a counter or the like.

Of course, the betting stations 26 may have various configurations as are well known in the art and need not have the configuration just described.

In one embodiment, the host system may include a variety of other features. For example, the host 20 may accept wagers at one or more windows. A staffer may work each window, accepting wagers from bettors and dispensing tickets to them. Each staffer may use a similar betting station to facilitate this process for each bettor. The host system may also include one or more maintenance, control or management terminals. Preferably, these terminals are in communication with the server 24 and/or betting stations 26, thus permitting the host to manage them. For example, the host may use the terminals to input wagering event information such as horse race information including the names of horses, to update system software, and view system information. For example, the terminals may be used to view accounting information such as amounts wagered on particular races, the size of wagering pools, the size of the take-out, the odds, payouts and a wide variety of other information, such as individual bettor account information.

As illustrated, one or more non-host distributors, such as off track betting hosts (OTBs), are configured to communicate with the host 20. The OTBs are preferably located remotely from the host 20 in a geographic sense, preferably not being located at the host's location and most preferably being located distant there from.

Each OTB is preferably configured to accept one or more wagers for participation in wagering opportunity presented by the host or host 20. In one embodiment, two OTBs, OTB1 and OTB2 are illustrated. Of course, there might be a single OTB or more than two OTBs.

The OTBs are preferably configured to accept wagers from bettors for wagering upon the wagering events of the track host 20. In one embodiment, each OTB has a betting system 100. The OTB betting system 100 may comprise at least one server 102 and a controller or station 104. The server 102 may be similar to the track host server 24, such as comprising a computing device having a processor or controller, communication interface and associated data or software storage.

The OTB controller station 104 may be used by the OTB host to manage the server 102, including interacting therewith such as to enter wagering information, update software, view wagering event information and the like, as described below. The OTB controller station 104 might comprise a kiosk, a computing device or the like. Preferably, the OTB controller station 104 includes a controller or processor, one or more user input devices such as a keyboard and mouse, and one or more video displays. Also, the OTB controller station 104 preferably includes a communication interface.

The OTB system 100 might include a plurality of other components. For example, the OTB system 100 might include one or more betting stations, ticket or receipt printers and the like.

As illustrated in FIG. 1, the OTB systems 100 are preferably in communication with the host system 20 at one or more (or all) times. For example, the OTB system servers 102 may be in communication with the host server 24 via one or more communication links L. Such communication links L may comprise shared or dedicated communication pathways, including LANs and/or WANs, private and/or public networks, and such links may be wired and/or wireless. For example, as illustrated, such a link L may comprise a communication path through the Internet.

The communication link(s) L preferably permit the OTB to obtain wagering event information from the track host 20, such as information regarding particular horse races, odds and wagering pool sizes. Likewise, the OTB may share wagering event information with the track host 20, such as the total amounts wagered by the OTB bettors on the track host's wagering events, as detailed below.

The OTB is preferably configured to accept wagers from one or more bettors B1, B2, etc. In one embodiment, the bettors might place wagers in person with the OTB. For example, the bettors might travel to the OTBs location and arrange a wager with the OTB. The OTB host might enter wager information into the control station 104, print a receipt or ticket for the bettor and the like. If the OTB system 20 includes one or more betting stations, then the bettors may place their wagers using those stations.

In another embodiment, the bettors might place bets remotely via one or more communication links. In one embodiment, a bettor might place a wager by phone. In another embodiment, as illustrated, bettors might place bets by interacting with the OTB system 100. For example, a bettor might use an electronic communication device such as a phone, PDA, tablet, desktop or laptop computer, to access the OTB server 102 via a communication link such as the Internet.

The OTB server 102 may present wagering event information for transmission to the bettor, accept wager information from the bettor, and generate and transmit wager receipt information to the bettor.

In a preferred embodiment, the OTBs and track host 20 are configured to accept wagers. The wagers might comprise physical monies such as paper currency or coins, or representations thereof such as checks. The wagers might also comprise units from a wagering account which has been established by a bettor with or at an OTB, into which the bettor has deposited funds or consideration. In addition, the wagers might be placed using credit or debit cards or other electronic forms of payment. In such event, the OTB system 100 and track host system 22 may include wager accepting devices such as credit card or FOB readers and the like. In addition, the OTB system 100 and track host system 22 may include one or more communication links to financial institutions or clearinghouses for the purpose of processing payments for wagers.

One type of wagering event and a method of wagering in accordance with the invention will now be described with reference to FIG. 2.

In accordance with one embodiment of the invention, a host offers a wagering opportunity relative to an event. Relative to the configuration illustrated in FIG. 1, the host might comprise a horse track operator. The wagering opportunity might be offered relative to a horse race, wherein the wagering opportunity offers bettors the chance to wager that one of at least two horses will win the race. As described below, the wagering opportunity and the associated event may vary.

Preferably, the wagering opportunity is configured as a pari-mutuel wagering opportunity. In accordance with this wagering opportunity, bettors place wagers having values, such as a monetary value. The host may accept wagers direct, such as from first, primary or "base" bettors (which accepted wagers, along with those from the non-host distributors, form the GPMP). Relative to the system illustrated in FIG. 1, the track operator may, for example, accept wager from primary bettors via the one or more betting stations 26.

Preferably, the host deducts an amount from each primary bettor's wager at the base take-out rate. This deduction is retained by the host and is referred to herein as the "host take-out", though it may be referred to by other terms such as a commission, vig or the like.

The amount of the take-out may vary as between wagering pools and legal jurisdictions, but in the embodiment illustrated it comprises 10% of each primary bettor's wager. The take-out may comprise greater or lesser amounts, such as 10-30% of the wager (as is more typically in pari-mutuel events).

The remainder of each primary bettor's wager (after application of the applicable take-out) is placed into a winnings pool, defined above as the NPMP. In accordance with the pari-mutuel arrangement, bettors who correctly select the winning outcome of the event all share in the NPMP or return/winnings pool (preferably in relation to the size of their wager, as described in more detail below).

In accordance with the invention, one or more non-host distributors, such as OTBs, also accept wagers upon the events as part of the wagering opportunity. Relative to the configuration illustrated in FIG. 1, one or more secondary bettors may place wagers with the OTB, such as directly or online or the like.

In a preferred configuration, each non-host distributor pays a commission to the host, which commission is less than the host's take out. For example, if the host's take-out is 10% of the gross wagers accepted directly by the host, then the commission payable by the non-host distributor, such as the OTB, may be 3% of the gross wagers accepted by the OTB. The OTB retains the take-out it applies to wagers placed with it, less the commission which it pays to the host. As detailed below, the OTB may pay additional winnings (which are due to bettors who place wagers with the OTB at a modified take-out rate) and retain the remaining amounts as earnings.

In accordance with the invention, a take-out also applies to the wager of each secondary bettor. However, as described below, while ordinarily the host's base take-out rate applies to all wagers (of primary and secondary bettors) for purposes of calculating the size of the NPMP or winnings pool, in accordance with one or more embodiments of the invention, the payout or award to a secondary bettor may be based upon their wager less a modified take-out rate which differs from (and is preferably less than) the base take-out rate. A bettor who places a wager at a modified or second take-out rate may be referred to as a "modified bettor" (as compared to a base bettor who places a wager at the base take-out rate). For example, while the host may apply a take-out rate of 20% to all wagers placed on the event, modified bettors might be paid through the non-host distributor as though the bettors' wagers were placed at a lower take-out rate, such as a rate of between 0% and 19%.

Various aspects of the invention will become apparent from a specific example of the application of the invention with reference to FIG. 2. In this example, a host TRACK is presenting a horse race between horses 1 and 2. The TRACK accepts wagers directly and also accepts wagers through an OTB. The TRACK applies a take-out rate of 10% to all wagers. However, the take-out associated with wagers by OTB bettors is retained by the OTB, with the OTB instead paying the TRACK a 3% commission the gross wagers placed through the OTB.

As illustrated, a first primary bettor, Bettor A has placed an "on the nose" wager of $20,000 that horse 1 will win the race. A second primary bettor, Bettor B, has placed an "on the nose" wager of $10,000 that horse 2 will win the race.

In addition, a non-host distributor, OTB, has also accepted wagers on that same event. A secondary Bettor C has placed a wager of $10,000 with the OTB upon horse 1. A secondary Bettor D has placed a wager of $30,000 with the OTB upon horse 2, and a secondary Bettor C has placed a wager of $20,000 with the OTB upon horse 1.

In accordance with this example, the total wagers on the event, or the GPMP, comprise $90,000. Assuming the 10% take-out rate, the base Take-Out is 10%*$90,000, or $9,000, thus leaving $81,000 as the Return Pool or the NPMP (i.e. the amount which is distributable to the winners of the event).

Assuming that horse 1 wins the race, Bettors A, C and E share the Total Pool. Each bettor is paid a base or normal payout comprising a proportion of the Return Pool or NPMP based upon the size of their wager to the other winning bettors' wagers. In this case, winning bettors A, C, and E placed wagers of $20,000, $10,000 and $20,000, or a total of $50,000. Bettor A is thus paid his proportion, $20,000/$50,000 of the $81,000 Total Pool, or a base payout of $32,400. Bettors C and E are also awarded their proportion of the pool, or $16,200 and $32,400, respectively.

As detailed herein, the take-out which is applied to each secondary bettor's wager might be the same as the base take-out rate or it might vary there from, such as depending upon one or more criteria. In one embodiment, each secondary bettor may apply a number of take-out points (described in more detail below) to the OTB's base take-out, thus reducing the take-out for that particular secondary bettor. Each point may, for example, reduce the take-out rate by 1%. Assuming that the base take-out rate is 10%, a bettor who applies 1 take-out point reduces the take-out to 9%, etc.

In this example, Bettor C has applied 5 take-out points, so that a 5% take-out rate applies to Bettor C. Bettor D has applied 3 take-out points, so that a 7% take-out rate applied to Bettor D.

Because Bettor D did not win his wager, the lower take-out rate does not apply to Bettor D (i.e. because Bettor D lost the bet, he loses his entire wager).

Because Bettor C won his wager, Bettor C is entitled to pay-out which is based upon a lower take-out rate. In particular, Bettor C is paid winnings based upon a calculated take-out rate of 5%, rather than the standard 10% as calculated above.

FIG. 2 illustrates one embodiment of such a calculation. As illustrated, a 5% take-out rate is applied to the original Total Wagers or GPMP (of $90,000) for a Take-Out of $4,500, and thus a recalculated or modified Return Pool or NPMP of $85,500. It is noted that this modified Return Pool or NPMP is fictitious. In particular, as noted above, the actual Return Pool or NPMP comprises only $81,000. The value of this fictitious Return Pool or NPMP is necessary for determining the actual payout that should be paid to a bettor who placed their wager not at the base take-out rate, but the modified take-out rate. Bettor C's share of such a recalculated or modified pool would be $10,000/$50,000*$85,500, or $17,100. This is the total mount which the OTB owes Bettor C.

In accordance with the invention, Bettor C was entitled to $16,200 from the actual Return Pool or NPMP (the base payout at the actual higher base take-out rate). Thus, of the $17,100 which is owed to Bettor C, $16,200 is paid from the actual Return Pool.

Because the share of the actual pool of $81,000 which can be paid to Bettor C is $16,200 (without affecting the payouts to Bettors A and E), OTB must make up the difference to Bettor C of $900 (the difference between the higher payout of $17,100 which is owing and the $16,200 which can be paid from the actual Return Pool). It will be appreciated that because Bettor C's wager was placed at a lower take-out rate, Bettor C was paid $900 more in winning than if Bettor C's wager had been placed at the normal base take-out rate.

The OTB may pay the track commission and additional winnings (beyond the base payout from the Return Pool or NPMP) from the OTB's take-out. In this example, out of the original $90,000 in wagers, TRACK receives $3,000 in Take-Out (i.e. the wagers of Bettor A and Bettor B, totaling $30, 000, multiplied by the 10% Take-Out Rate)), plus a 3% commission on the wagers received by OTB (3%*$60,000=$1, 800), or $4,800.

OTB generates earnings in the amount of $3300.00: $6,000 in Take-Out (from the wagers received by OTB), less the commission paid to the TRACK of $1,800, less the extra $900 paid to Bettor C (which is owed to Bettor C as a result of the higher payout due to the reduced take-out rate), or $3,300.

Thus, of the original $90,000 in wagers: $4,800 is retained by TRACK, $3,300 is retained by OTB, $32,400 is paid to Bettor A, $17,100 is paid to Bettor C, and $32,400 is paid to Bettor E.

FIG. 3 illustrates yet another example of the invention. This example further illustrates the effect of a bettor's application of one or more take-out points to their wager.

In this example, 209,886 $1 Exacta tickets were purchased on Race 4 offered at a horse racing track. After deducting a 20% take-out from the wager pool, the remaining winnings pool or NPMP was $167,909.

After Race 4 was run, it was determined that there were 2761 winning tickets. Thus, each ticket was worth $167,090/ 2761, or $60.81, assuming that a 20% take-out was applicable to each winning bettor's ticket.

In accordance with one embodiment of the invention, secondary bettors who purchased tickets through an OTB may have been offered a lower take-out rate, or offered the chance to select their own take-out rate. For example, in one embodiment, the OTB might have offered bettors the opportunity to apply 5 take-out points to reduce the take-out to 15%, 10 take-out points to reduce the take-out to 10%, 15 take-out points to reduce the take-out rate to 5%, or 20 take-out points to reduce the take-out rate to 0%. As illustrated, the value of each winning ticket based upon those modified take-out rates may be determined by multiplying the original wager pool of $209,886 by the new take-out rate, and then dividing the modified total pool by the number of winning tickets, or 2761. As can be seen, a reduction in the take-out rate causes the value of each winning ticket to increase in value.

For example, assuming that the OTB sold 1 ticket to a bettor who applied 10 take-out points, that bettor would be paid winnings of $68.41. Of this amount, $60.81 would be paid from the Return Pool or NPMP and the remaining $7.60 would be paid by the OTB (such as from their total Take-Out).

As indicated above, as one aspect of the invention, a pay table may be provided which indicates the payoffs for the wagering opportunity. This pay table may be displayed by a host or non-host distributor, such as to allow bettors who have placed wagers at different take-out rates to determine their win. Thus, the pay table may provide information regarding payoffs calculated at different rates, including the host take-out rate and then one or more second, lower, take-out rates.

In accordance with the present invention, a non-host distributor may offer their bettors the opportunity to be paid winnings from a pari-mutuel pool at a take-out rate which differs from the primary or host take-out rate. In one embodiment, the non-host distributor might offer different secondary take-out rates (and thus different payouts) to different secondary bettors, where those bettors are wagering via the same or different locations or sites, whether they are wagering upon the same or different wagering opportunity (including upon the same or different event or pool). In one embodiment, the non-host distributor might offer a modified rate at various times or based upon various conditions. For example, a non-host distributor might offer a lower applicable take-out rate to all bettors on a particular event, on all events of a particular date or time or the like. For example, when the standard take-out is 20% for all races at Track A, an OTB might offer a 15% rate to all bettors who bet on races at Track A on Mondays.

In another, and most preferred, embodiment the non-host distributor might offer bettors the opportunity to select their own customized take-out rate. This might be facilitated by application of one or more take-out points, as described above. Each take-out point may have a value, such as 1%, which value is deducted from the normal rate. In another example, take-out points might have values of less than 1% (such as 0.5%) or more than 1% (such as 2 or 5%), or the value of the points might event vary from time to time. In this regard, a "take-out point" may comprise a value which reduces a take-out value. Take-out points might have other associated criteria of use, such as being limited to use in certain wagering events (such as only upon wagering opportunities relating to horse races at a certain track, wagering opportunities on certain days, upon wagers having a certain threshold or the like). In general, a bettor might apply take-out points in a manner which permits the bettor to customize or personalize their own take-out rate relative to a non-host distributor, including relative to the GPMP or NPMP.

In one embodiment, bettors might be provided take-out points (such as upon opening an account or for a particular event) or might be required to earn them. For example, for each $100 wagered by a bettor, an OTB might award the bettor with 1 take-out point. A bettor might only be permitted to utilize one take-out point at a time, or might be permitted to aggregate and use multiple of them. In one embodiment, the OTB or other entity might cap the maximum reduction in the take-out. For example, if the standard take-out rate is 20%, the OTB might only permit the take-out rate to be reduced to 10% (i.e. reduce the base take-out rate by a maximum of 50%). In other embodiments, the take-out rate might be modifiable to 0%.

Of course, the principles of the invention may apply to different types of wagers and/or events. For example, the principles of the invention might apply to other types of horse racing wagers such as an exacta, quinella, tri-fecta, daily double, across-the-board, pik-3, pik-4, pik-6 or other wager. The principles might also apply to other types of events such as dog races, casino-style gaming (poker, slot or other types of games) and lottery events (including video lottery), keno games and bingo games, sports events (including, but not limited to football, soccer, Jai Ali, rugby, baseball or other team or individual sports event), among others. In such events, the take-out may more commonly referred to as a vigorish, rake or by other terms.

In one embodiment, secondary take-out rates might be varied over time, such as by raising or lowering the take-out rate as the start of an event approaches (for example, an OTB might lower a take-out rate as an event approaches in order to entice additional wagers). Different take-out rates might also be set relative to different pools of a wagering opportunity. For example, a wagering opportunity might offer pools on the Win, Place and Show positions of a horse race. The take-out rate might differ for each of those pools (for example, a non-host distributor might set a take-out rate of 15% for wagers on the Win pool, 18% for wagers on the Place pool, and 20% on the Show pool).

In one embodiment of the invention, a bettor might place wagers relative to a wagering opportunity at two or more different take-out rates (such as one wager at a 15% take-out rate and a second wager at a 10% take-out rate relative to the same wagering opportunity). In addition, take-out rates might change or vary. For example, a wagering opportunity might be provided which "rolls over" if there is no winner. A bettor might place an initial wager at a take-out rate of 22%. After Day 1, if the wagering opportunity had no winner, the bettor's wager (and the pari-mutuel pool) might roll over and a bettor might place an additional or new wager on the event on Day 2. That additional wager might be applied at a 15% take-out rate relative to Day 2 of the wagering opportunity. Of course, such a principle might be applied relative to various time periods, events and the like.

As indicated above, the principles of the invention may apply to various wagering opportunities, including wagering opportunities other than horse races. For example, FIG. 4 illustrates one example of the invention as applied to a lottery event. In this example, host Super Lottery, offers a lottery in which lottery tickets are sold in different states (where each state comprises a non-host distributor which sells tickets through one or more outlets or locations). Each ticket might comprise, for example, a $1 wager.

In this example, ten (10) states each sold lottery tickets. The total of all tickets sold was $300M (i.e. the "total wagers" or GPMP).

The host applies a take-out of 32% of the total tickets, or $96M. The host keeps 2% of the total tickets, or $6M as an administrative fee, and returns the remaining $90M to the states (based upon the net 30% take-out rate) in proportion to the total tickets sold in each state. In this manner, each state is incentivized to sell as many tickets as possible, as each state is returned a percentage of its lottery ticket sales. FIG. 4 illustrates the return to each state based upon its lottery ticket sales.

After application of the $96M take-out, the Return Pool or NPMP to be paid to the one or more winners is $204M. Thus, for example, in this base configuration if there were a single winner, that winner would be paid $204M.

In accordance with the invention, one or more of the states might offer their bettors a modified payout based upon a modified take-out rate. For example, Iowa might offer one or more bettors who purchase lottery tickets in that state a payout which is based upon a take-out rate of 25%, rather than 30% (in one embodiment, the state or non-host distributor might set the altered take-out rate, and in others, the bettor might be permitted to select their take-out rate, including by using one or more take-out points, by placing wagers of certain thresholds or the like).

Of course, losing lottery tickets are not paid. If the winning lottery ticket were purchased in Iowa at the modified 25% rate, the winner would be paid an extra 5%.

The modified or extra winning amount may be offered to the bettor based upon the total pool or the state's sub-pool. For example, if Iowa offered to pay the increased winnings based upon the total pool, the bettor would be paid an extra 5%*300M, or $15M. Thus, the total payout to the bettor would be the base payout of $204M plus $15M, or $219M. On the other hand, if Iowa offered to pay the increased winnings based upon the Iowa sub-pool, the bettor would be paid an extra 5%*18M, or $0.9M. Thus, the total payout to the bettor would then be the base payout of $204M plus $0.9M, or $204.9M.

The invention might similarly be applied to a bingo game. A host might sell bingo cards for $1, offering return to the sellers of the cards (such as a 10% take-out) and offering a pari-mutuel pool of winnings Off-site bingo sellers might offer cards to purchasers thereof at a lower take-out rate, such as 7%, in similar manner to that described above.

As another example of the invention, a host (such as a casino) might offer a poker game to a plurality of players wherein the host is paid from a rake (i.e. a percentage or cut) of the wager placed by the players. In such a game, the host might offer a rake of a first percentage (such as 2%) to a first player and a rake of a second percentage (such as 5%) to the remaining players, whereby the first player retains a higher portion of the wager pool if they win (than if the higher rake percentage applied to them). Again, the players might be permitted to use take-out or "rake" points to change the rake percentage which applies to them.

In addition, this aspect of the invention might apply to other types of events such as sports events. For example, a number of sports books or casinos may accept wagers into a large pool. Each sports book or casino might offer bettors who place wagers through them with the opportunity to place wagers at take-out rates which vary from those of the other sports books or casinos.

Various additional aspects of the invention, as well as benefits thereof, will now be described.

As indicated above, various principles of the invention may be implemented in a wagering system. As one aspect of the invention, bettors might be presented with wagering options, such as base and modified take-out rates (including upon the same event and even possibly in the same pool). This information might be displayed graphically, such as via a graphical user interface of a bettor's computer or a display of a betting station or the like. For example, a bettor might be presented with a menu such as:

Race 4

| Wager | Take-Out Rate/Points |
|---|---|
| $1 | 20%/0 |
| $1 | 15%/5 |
| $1 | 10%/10 |

It is also possible for the menu to provide information regarding the probable return for a winning wager based upon various take-out rates. Of course, the actual payouts could change based upon wagers placed before and after the bettor places their wager. However, this information could provide the bettor with useful information regarding the benefits of applying take-out points. For example, such a menu might display:

Race 4

| Wager | Take-Out Rate/Points | Projected Winning Ticket Pay |
|---|---|---|
| $1 | 20%/0 | $60.81 |
| $1 | 15%/5 | $64.61 |
| $1 | 10%/10 | $68.41 |

The system may track awards of take-out points to particular bettors and also the balance of take-out points for each bettor. A bettor's take-out points might be displayed to the bettor. In such a configuration, each bettor may be required to provide identifying information. For example, an OTB may generate a unique account for each bettor. The bettor may utilize a login ID, password or the like to identify themselves and their associated account. For example, a bettor might access the OTB's server and enter their login ID and password. The OTB may utilize that information to access one or more associated files. Those files may contain information regarding the name, address, phone number and the like of the bettor. Those files may also contain information regarding a number of accrued take-out points, historical wager information and the like. The bettor might also access their account in order to add funds to their account (to place additional wagers), place wagers, and request a payout for a winning wager, to determine their account balance, and/or obtain other information regarding their account.

The number of accrued take-out points may be displayed to the bettor so that the bettor knows how many points are available to them to be used in reducing the take-out rate.

As described, in one or more embodiments, an entity might apply a lower or modified take-out rate to all wagers on an event. Alternatively, a lower take-out rate might be applied to only one or more, but not all bettors on a particular event. As also indicated, different bettors may select and have different take-out rates (for example, a plurality of primary bettors may place wagers at a base take-out rate such as 20%, while one second bettor may place a wager at one modified take-out rate of 15%, while yet another second bettor may place a wager at a different modified take-out rate of 10%). In this regard, one aspect of the invention is the ability of a non-host distributor (or the non-host distributor's bettors) to set take-out rates which are different than the host. In addition, as another aspect of the invention, take-out rates and payoffs may be set at rates and schedules which are different than the standard rates of any host or non-host distributor (such as by application of bettor take-out points to the rates of hosts or non-host distributors).

One aspect of the invention comprises the act of recalculating take-out rates and/or payoff after standard payoff results are distributed by a host or non-host distributor. As indicated above, for example, a standard payoff may be disseminated by a host after the results of an event and associated wagering opportunity are known. The host and/or non-host distributor, however, might also then recalculate the payoff for bettors who placed wagers at other take-out rates.

As indicated above, the principles of the invention may apply to various types of events, including events having multiple pools or sub-pools. For example, as described above, the principles of the invention may be applied to a wagering opportunity having win, place and show pools/sub-pools. As another example, in a lottery different types of outcomes may be paid winnings. For example, a bettor who correctly selects all 7 required numbers may be paid a winnings jackpot which comprises a portion of the pool. A bettor who correctly selects 6 of 7 numbers might be paid a consolation win, such as a sub-portion of the pool.

While various arrangements have been described regarding the placement and acceptance of wagers, bettors may place wagers, and the host and non-host distributors (such as an OTB) may accept wagers, by various means. For example, bettors may place wagers directly (such as at window or office of a host or non-host), via a betting station, via a computer, PDA, telephone, kiosk or other device, including by wireless and/or wired networks including cell phone networks, the Internet and the like. In general, the mechanism by which a wagering customer or bettor places a wager is irrelevant to the key aspects of the invention.

While the invention has particular applicability to a configuration in which second bettors place wagers with a second entity or non-host distributor, wherein the non-host distributor places the wagers with a host, it is possible for the principles of the invention to be applied in other situations. For example, as described above, the principles of the invention may be directly applied or utilized by the host, wherein the host may accept wagers and offer different take-out rates to different bettors/players. As one example, a host might directly allow players to use take-out or "rake" points to change the take-out or rake percentage which applies to them vis-à-vis a game offered to the player directly by the host/house.

The principles of the invention may be applied when the host and/or non-host distributor applies or does not apply breakage principles. As is well known in the art of standard pari-mutuel pools, winning payoffs are sometimes rounded in value. For example, if a winning pool ticket is calculated to be $4.87, a host might round the payoff to $4.80, the host keeping the $0.07 "breakage" for each winning ticket. Such a breakage principle may also be applied to payoffs paid at lower take-out rates in accordance with the present invention.

The principles of the invention may also be applied to pari-mutuel pools where the host applies net pool pricing in accordance with the prior art. The net pool pricing feature is often applied when a host receives wagers in differing currencies from non-host distributors. For example, a host in the United States may accept wagers from primary bettors in U.S. dollars and at a host take-out rate of 20%. However, an OTB in France might accept wagers from secondary bettors in Euros and at a take-out rate of 15%. Likewise, an OTB in Japan might accept wagers from secondary bettors in Yen and at a take-out rate of 18%. In this arrangement, the host may determine the payouts to individual bettors based upon a standardized blended take-out rate that accounts for the exchange rates (the calculated value of each wager that was placed in a second denomination, such as Yen or Euros, into the first denomination, such as U.S. dollars) and the variance in take-out rates. In accordance with the present invention, the take-out rates may be varied from that calculated standardized blended rate, such as by permitting a bettor or a non-host distributor to vary the take-out rate from the net pool pricing rate. In this regard, the invention is applicable to instances where the NPMP is calculated using various take-out rates which may be set by law or regulation in the OTB's jurisdiction.

The principles of the invention may be implemented via a system such as illustrated in FIG. 1. In particular, a host 20 may transmit wagering event information to each non-host distributor, such as OTB1 and OTB2. For example, this information may be transmitted from the host 20 to each OTB electronically over a network. Each OTB may report wagers upon the event back to the host 20 in a similar manner. As wagers are accepted and/or at the conclusion of the event, the host 20 may post or transmit additional information regarding the wagering event, such as information regarding the GPMP or NPMP. The OTBs may use this information in determining amounts which must be paid to the OTBs bettors. In one embodiment, the OTB may use software, such as running on the server 102, to determine the payouts for each of the OTBs bettors. In this regard, various aspects of the method of wagering disclosed herein may be implemented in a computing environment, such as with machine readable/executable code or "software".

For example, relative to the example illustrated in FIG. 4, an OTB may utilize software which is configured to calculate the new ticket pay at various modified take-out rates. The system may receive as inputs the number of winning tickets and the GPMP or NPMP from the host, either manually input or received electronically (such as synced to the host system). The software may then utilize those inputs to generate the new ticket pays. The software may also match the new ticket pays to the particular tickets which were purchased by bettors at different take-out rates, thus providing the OTB operator with information regarding the exact ticket pay for each ticket (for example, upon a bettor redeeming their ticket, the OTB may input the bettor's ticket number into the OTB system and the system may confirm the ticket, confirm that the ticket is winning, be provided the amount to be paid by the OTB to the bettor, and then flag the ticket as having been paid).

In this regard, the method of the system may essentially be fully automated. For example, a bettor may place a wager with an OTB using an OTB betting system (such as by placing a wager electronically via a computer in the manner described above, wherein the wager may include an input of a number of take-out points from the bettor). The bettor may wager funds which are associated with the bettor's account with the OTB. The OTB system may record the wager and then, as described above, determine the outcome of the wager including any winnings. The winnings may be paid by crediting the bettor's account.

The invention has numerous advantages. A primary advantage is that pari-mutuel wagering event bettors are enticed to place wagers at a second rate which is lower than a first or base rate, either by a bettor's selection of their own customized modified take-out rate (such as through application of take-out points or the like) or by rates determined by the non-host distributor. This offers the bettors a chance at a higher payout or return on their wager, if it is a winning wager. For example, an OTB may offer lower modified take-out rates to their bettors in order to entice more bettors to place wagers and to entice bettors to place larger wagers.

At the same time, the present invention has the advantage that the entities, such as the OTBs, can still be profitable. In particular, in a preferred embodiment, a full take-out is still applied to all losing wagers, and assuming the modified take-out rate is not 0%, some take-out is applied to even winning wagers. This take-out provides a revenue source to the OTB or other entity which can also be used to "fund" the higher paybacks to winning bettors who placed wagers at lower, modified take-out rates.

Another aspect of the invention is that winning bets are paid based upon the actual lower take-out rate. For example, an OTB might employ other means to entice bettors to place wagers. An OTB might offer to refund or rebate a portion of a larger bettor's winning wager, in addition to their payout from the pari-mutuel pool. However, this configuration has the disadvantage that the return to the bettor is not tied to the actual wager pool. In addition, in this configuration the rebate or refund must be paid by the OTB even when the bettor lost their wager. A benefit of the present invention is that the modified payout is tied to the wagering pool (including the Return Pool and the number of winning wagers). Thus, the amount paid to the winning bettor and the liability to the OTB is based upon the actual pool values. In addition, as indicated above, the OTB only pays the higher winnings to the bettor in the event their wager is winning (thus, while the OTB can entice all bettors with lower take-out rates, the OTB only pays out those benefits in the event the bettor wins their wager).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of determining a wagering pool payout at a server comprising at least one processor, at least one transceiver for sending and receiving data over at least one communication link, and a data storage device comprising machine-readable instructions that are executed on the at least one processor, the server being communicatively connected to at least one station, the at least one station comprising at least on input device for receiving wager information regarding a wager placed by a bettor, the method comprising:

accepting multiple wagers from two or more bettors upon a wagering event and receiving wager information regarding said multiple wagers at the at least one station via the input device and receiving said wager information regarding the multiple wagers at the server from the at least one station;

calculating at the server a gross wager pool comprising a sum of the amount of all of said multiple wagers;

applying at the server a base rake rate to said total wager pool to determine a base rake amount from said gross wager pool;

calculating at the server a net pool, said net pool comprising said gross wager pool less said base rake amount;

determining at the server the one or more winning wagers upon said event;

calculating at the server a base win for each winning wager comprising each winning wager's proportion of said net pool to all winning wagers;

determining at the server if any winning wagers selected at least one modified rake rate which is less than said base rake rate and, if so:

applying at the server said modified rake rate to said gross wager pool to determine a modified rake amount;

calculating at the server a modified net pool, said modified net pool comprising said gross wager pool less said modified rake amount;

calculating at the server a modified win for each winning wager comprising each winning wager's proportion of said modified net pool to all winning wagers; and paying each winning wager placed at said base rake rate said base win for said wager; and paying each winning wager placed at said modified rake rate said modified win for said wager.

2. The method in accordance with claim 1 wherein said wagering event comprises one or more poker games.

3. The method in accordance with claim 2 wherein said wagers comprise an ante and/or entry fee.

4. The method in accordance with claim 1 wherein said wagering event comprises sporting event.

5. The method in accordance with claim 1 further comprising the step of offering a bettor an opportunity to select a wager at said base rake rate or at said at least one modified rake rate.

6. The method in accordance with claim 5 wherein said base rake rate comprises a first percentage rate and wherein said at least one modified rake rate is at least 1% less than said first percentage rate.

7. The method in accordance with claim 1 wherein said at least one modified rake rate is no less than 50% of said base rake rate.

8. The method in accordance with claim 1 comprising retaining as a rake an amount equal to said gross wager pool less said amounts paid for winning wagers.

9. A method of wagering on a wagering event wherein wagers from at least one first bettor and at least one second bettor are pooled and a house takes a rake amount from said pool based upon a base rake rate applied to said at least one first bettor and a second lower rake rate applied to said at least one second bettor, the method being carried out on a server comprising at least one processor, at least one transceiver for sending and receiving data over at least one communication link, and a data storage device comprising machine-readable instructions that are executed on the at least one processor, the server being communicatively connected to at least one station comprising at least on input device for receiving wager information regarding a wager placed by the first or the second bettor, the station being communicatively connected to the server, the method comprising the steps of:

calculating at the server a gross wagering pool comprising a sum of all wagers;

determining at the server the one or more winning wagers upon said event;

for each winning wager by a second bettor:

applying at the server said lower rake rate to said gross wagering pool to determine a rake;

calculating at the server a modified net pool comprising said gross wagering pool less said rake;

calculating at the server a winning payout for each winning wager placed by a second bettor, said win comprising each winning second bettor's proportion of said modified net pool to all winning wagers; and paying each winning wager placed by a second bettor said win for said wager.

10. The method in accordance with claim 9 wherein said wagering event comprises one or more card games.

11. The method in accordance with claim 10 wherein said card game comprises one or more poker games.

12. The method in accordance with claim 10 wherein said house awards second bettors rake points and wherein second bettors may reduce said base rake rate by application of one or more rake points to result in one or more lower rake rates.

13. The method in accordance with claim 9 wherein said house comprises a casino.

14. A method of wagering in which a host offers a wagering event in which said host accepts wagers upon said event, wherein said event has a base rake rate applicable thereto and wherein base bettors who place winning wagers at said base rake are paid winnings from a wagering pool created from wagers placed upon said wagering event based upon said base rake rate, the method being carried out by a server comprising at least one processor, at least one transceiver for sending and receiving data over at least one communication link, and a data storage device comprising machine-readable instructions that are executed on the at least one processor, the server being communicatively connected to at least one station comprising at least on input device for receiving information regarding a wager placed by a bettor, the method comprising the steps of:

permitting one or more modified bettors to select a modified rake rate comprising a rake rate which varies from said base rake rate;

accepting a wager for participation in said event from at least one modified bettor that has selected a modified rake rate; and for each modified bettor who places a winning wager at a modified rake rate, paying winnings to said modified bettor based upon said modified rake rate applied to said pool.

15. The method in accordance with claim 14 wherein said modified rake rate is less than said base rake rate, whereby winnings paid to said modified bettor who places a winning wager are higher than said winnings paid to said base bettors who place winning wagers on the same wagering event.

16. The method in accordance with claim 14 wherein said base rake rate comprises a percentage of each wager.

17. The method in accordance with claim 14 wherein said wagering event comprises one or more card games.

18. The method in accordance with claim 17 wherein said card games comprise poker games.

19. The method in accordance with claim 14 wherein said base rake rate comprise a first percentage rate and said modified rake rate comprises a second percentage rate which is lower than said first percentage rate.

* * * * *